United States Patent
Zhang et al.

(10) Patent No.: US 11,966,711 B2
(45) Date of Patent: Apr. 23, 2024

(54) TRANSLATION VERIFICATION AND CORRECTION

(71) Applicant: International Business Machines Corporation, Armonk, NY (US)

(72) Inventors: Guang Ming Zhang, Beijing (CN); Xiaoyang Yang, San Francisco, CA (US); Hong Wei Jia, Beijing (CN); Mo Chi Liu, Beijing (CN); Yun Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 17/323,270

(22) Filed: May 18, 2021

(65) Prior Publication Data

US 2022/0374614 A1   Nov. 24, 2022

(51) Int. Cl.
*G06F 40/58*   (2020.01)
*G06F 40/51*   (2020.01)
*G06N 3/08*    (2023.01)

(52) U.S. Cl.
CPC ............. *G06F 40/58* (2020.01); *G06F 40/51* (2020.01); *G06N 3/08* (2013.01)

(58) Field of Classification Search
CPC ............ G06F 40/58; G06F 40/51; G06N 3/08
See application file for complete search history.

(56) References Cited

U.S. PATENT DOCUMENTS

| 7,191,115 B2* | 3/2007 | Moore | G06F 40/45 704/9 |
| 7,707,025 B2* | 4/2010 | Whitelock | G06F 40/45 704/4 |
| 8,229,729 B2* | 7/2012 | Sarikaya | G06F 40/44 704/250 |
| 9,081,762 B2* | 7/2015 | Wu | G06F 40/45 |

(Continued)

FOREIGN PATENT DOCUMENTS

CN   104881406 B   5/2018

OTHER PUBLICATIONS

Mell et al., "The NIST Definition of Cloud Computing", National Institute of Standards and Technology, Special Publication 800-145, Sep. 2011, 7 pages.

(Continued)

*Primary Examiner* — Bhavesh M Mehta
*Assistant Examiner* — Nandini Subramani
(74) *Attorney, Agent, or Firm* — Michael A. Petrocelli

(57) ABSTRACT

Embodiments of the present disclosure relate to a solution for translation verification and correction. According to the solution, a neural network is trained to determine an association degree among a group of words in a source or target language. The neural network can be used for translation verification and correction. According to the solution, a group of words in a source language and translations of the group of words in a target language are obtained. An association degree among the group of words and an association degree among the translations can be determined by (Continued)

using the trained neural network. Then, whether there is a wrong translation can be determined based on the association degrees. In some embodiments, corresponding methods, systems and computer program products are provided.

20 Claims, 13 Drawing Sheets

(56) References Cited

U.S. PATENT DOCUMENTS

| | | |
|---|---|---|
| 9,626,960 B2* | 4/2017 | Vozila .................... G10L 15/18 |
| 9,690,777 B1 | 6/2017 | Sotelo |
| 9,928,236 B2* | 3/2018 | Dixon .................... G06F 40/44 |
| 11,295,092 B2* | 4/2022 | Freitag ................ G06F 40/166 |
| 2015/0039286 A1* | 2/2015 | Nikoulina .............. G06F 40/40 |
| | | 704/2 |
| 2017/0060855 A1 | 3/2017 | Song |
| 2017/0076199 A1* | 3/2017 | Zhang .................... G06F 40/45 |
| 2019/0384822 A1 | 12/2019 | Tu |
| 2020/0098351 A1* | 3/2020 | Feinstein ............. G10L 15/005 |

OTHER PUBLICATIONS

Pintilie, D., "How to Translate WordPress Menu into Multiple Languages", TranslatePress., Jun. 8, 2020, 11 pgs., © 2020 Cozmoslabs.

* cited by examiner

600

```
projct-overview=Overview              project-overview=概述
project-assets=Assets                 project-assets=资产
project-environments=Environments     project-environments=环境
project-jobs=Jobs                     project-jobs=作业
project-settings=Settings             project-settings=设置 global-home=Home                      global-home=主页
global-projects=Projects              global-projects=项目
global-collect=Collect                global-collect=收集
global-organize=Organize              global-organize=组织
global-analyze=Analyze                global-analyze=分析
```

610

```
projct-overview=Overview              project-overview=概述
project-assets=Assets                 project-assets=资产
project-environments=Environments     project-environments=环境
project-jobs=Jobs                     project-jobs=作业
project-settings=Settings             project-settings=设置
```

620

```
global-home=Home                      global-home=主页
global-projects=Projects              global-projects=项目
global-collect=Collect                global-collect=收集
global-organize=Organize              global-organize=组织
global-analyze=Analyze                global-analyze=分析
```

FIG. 6

TRANSLATION VERIFICATION AND CORRECTION

BACKGROUND

The present disclosure relates to artificial intelligence, and more specifically, to methods, systems, and computer program products for translation verification and correction.

SUMMARY

According to some embodiments of the present disclosure, there is provided a computer-implemented method. The method comprises obtaining a plurality of groups of training data. Each of the plurality of groups of training data comprises a plurality of words in a source language and translations of the plurality of words in a target language. The method further comprises generating a plurality of data sets from the plurality of groups of training data. The plurality of data sets comprises a first data set in the source language, a second data set in the source and target languages and a third data set in the target language. The method further comprises training a neural network based on the plurality of data sets for determining an association degree among a group of words in the source or target language.

According to some embodiments of the present disclosure, there is provided a computer-implemented method. The method comprises obtaining a fourth group of words in a source language and a fifth group of words in a target language, wherein at least a part of the fifth group of words are translations of the fourth group of words to be verified. The method further comprises determining a fourth association degree among the fourth group of words and a fifth association degree among the fifth group of words by using a trained neural network. The method further comprises determining whether there is a wrong translation in the fifth group of words based on the fourth and fifth association degrees.

According to some embodiments of the present disclosure, there is provided a system. The system comprises a processing unit and a memory coupled to the processing unit. The memory stores instructions that, when executed by the processing unit, perform actions comprising: obtaining a plurality of groups of training data, wherein each of the plurality of groups of training data comprises a plurality of words in a source language and translations of the plurality of words in a target language; generating a plurality of data sets from the plurality of groups of training data, wherein the plurality of data sets comprises a first data set in the source language, a second data set in the source and target languages and a third data set in the target language; and training, based on the plurality of data sets, a neural network for determining an association degree among a group of words in the source or target language.

According to some embodiments of the present disclosure, there is provided a system. The system comprises a processing unit and a memory coupled to the processing unit. The memory stores instructions that, when executed by the processing unit, perform actions comprising: obtaining a fourth group of words in a source language and a fifth group of words in a target language, wherein at least a part of the fifth group of words are translations of the fourth group of words to be verified; determining a fourth association degree among the fourth group of words and a fifth association degree among the fifth group of words by using a trained neural network; and determining whether there is a wrong translation in the fifth group of words based on the fourth and fifth association degrees.

According to some embodiments of the present disclosure, there is provided a computer program product. The computer program product is tangibly stored on non-transient machine-readable medium and comprises machine-executable instructions. The machine-executable instructions, when executed on a device, cause the device to perform actions comprising: obtaining a plurality of groups of training data, wherein each of the plurality of groups of training data comprises a plurality of words in a source language and translations of the plurality of words in a target language; generating a plurality of data sets from the plurality of groups of training data, wherein the plurality of data sets comprises a first data set in the source language, a second data set in the source and target languages and a third data set in the target language; and training, based on the plurality of data sets, a neural network for determining an association degree among a group of words in the source or target language.

According to some embodiments of the present disclosure, there is provided a computer program product. The computer program product is tangibly stored on non-transient machine-readable medium and comprises machine-executable instructions. The machine-executable instructions, when executed on a device, cause the device to perform actions comprising: obtaining a fourth group of words in a source language and a fifth group of words in a target language, wherein at least a part of the fifth group of words are translations of the fourth group of words to be verified; determining a fourth association degree among the fourth group of words and a fifth association degree among the fifth group of words by using a trained neural network; and determining whether there is a wrong translation in the fifth group of words based on the fourth and fifth association degrees.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 6 depicts an example of obtaining training data according to embodiments of the present disclosure.

Throughout the drawings, same or similar reference numerals represent the same or similar elements.

DETAILED DESCRIPTION

Figure 1:
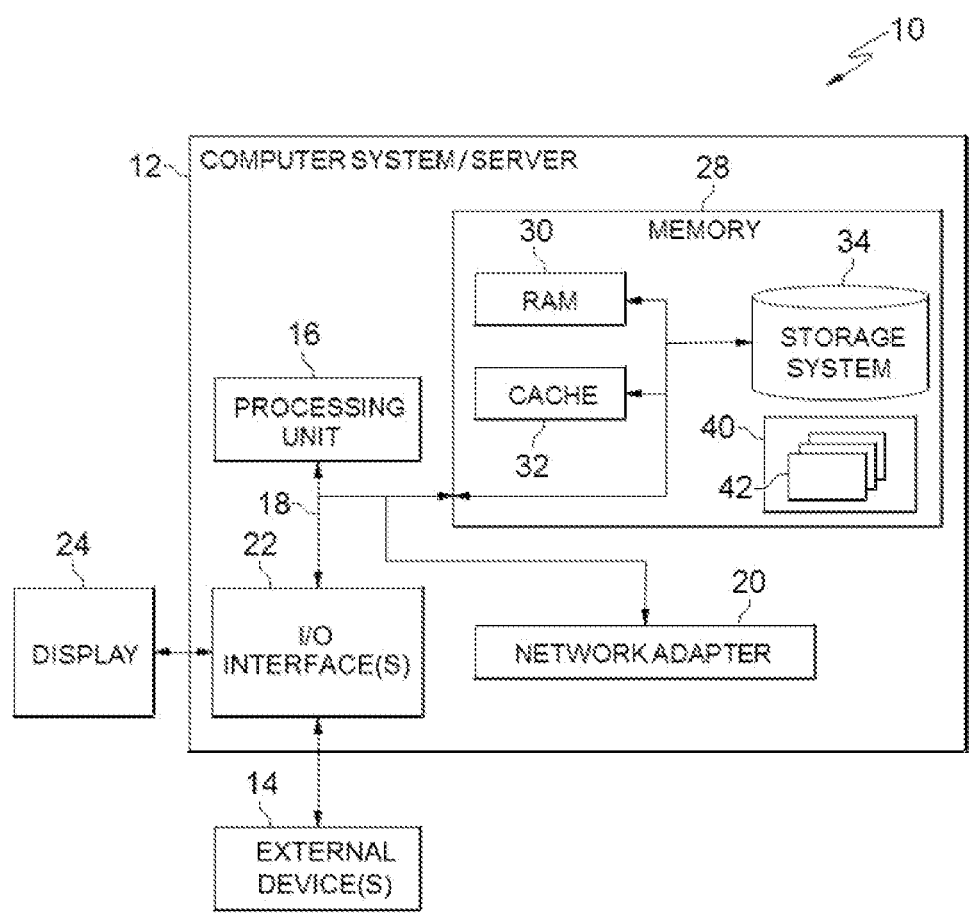
FIG. 1 depicts a cloud computing node according to an embodiment of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
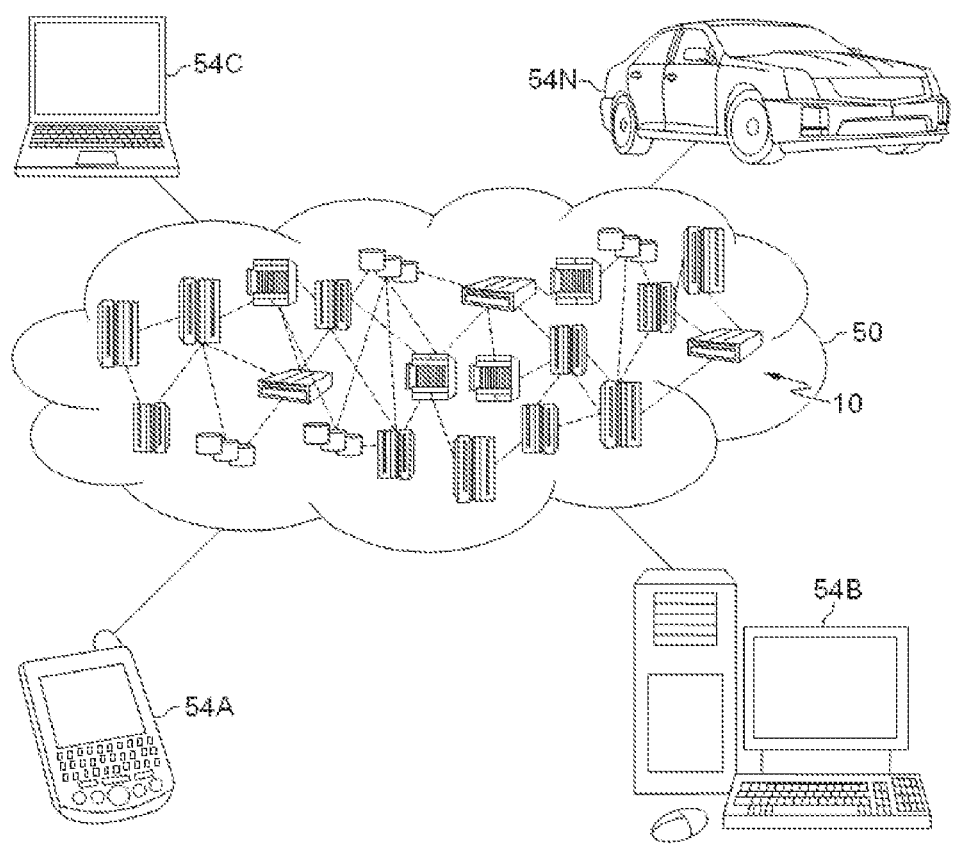
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
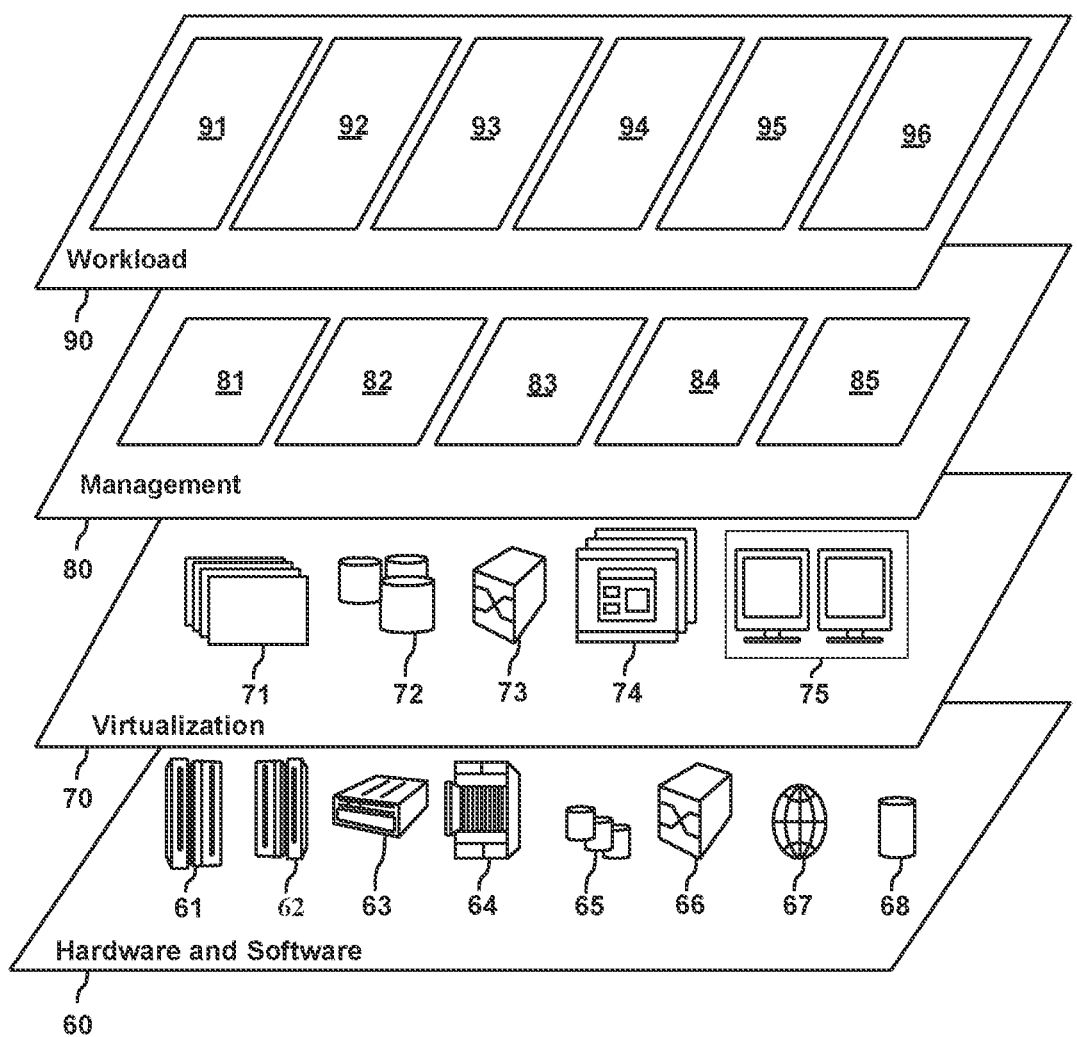
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and translation verification and correction 96. Hereinafter, reference will be made to FIG. 4-12 to describe details of the translation verification and correction 96.

It is easy for a translator or modern translation software to translate a sentence or a paragraph from a source language to a target language. However, when translating isolated words, such as, user interface menu/tab items, there is no proper context to consider during the translation. Therefore, translation errors may occur.

As described above, it is easy for a translator or modern translation software to translate a sentence or a paragraph from a source language to a target language. However, when translating isolated words, such as, user interface (UI) menu/tab items, there is no proper context to consider during the translation. Therefore, translation errors may occur. For example, a group of UI menu items coming from a same UI may include "Overview", "Assets", "Environments", "Jobs" and "Settings". A translator may translate the group of UI menu items into Chinese, such as, "概述", "资产", "环境", "乔布斯", and "设置". It can be seen that the Chinese translation of "Jobs" is not proper here and the correct translation of "Jobs" here should be "作业". Usually, it requires huge manual efforts to identify and correct such translation errors.

In order to at least partially solve the above and other potential problems, embodiments of the present disclosure provide a solution for translation verification and correction. According to the solution, a neural network is trained to determine an association degree among a group of words in a source or target language. The neural network can be used for translation verification and correction. According to the solution, a group of words in a source language and translations of the group of words in a target language are obtained. An association degree among the group of words and an association degree among the translations can be determined by using the trained neural network. Then, whether there is a wrong translation can be determined based on the association degrees. In response to determining that there is a wrong translation, cross validation can be performed by using the trained neural network to identify the wrong translation from the translations of the group of words. In addition, a correct translation can be determined from a plurality of candidate translations by using the trained neural network.

As such, a translation error can be automatically identified and corrected without human intervention. This solution can be used to identify and correct a translation error in translations of isolated words, including but being not limited to, a translation error in translations of UI menu/tab items.

In the following, English will be taken as an example of the source language and Chinese will be taken as an example of the target language. It is to be understood that, this is merely for the purpose of illustration, without suggesting any limitations as to the scope of the present disclosure. Embodiments of the present disclosure are also applicable to other source and target languages.

Figure 4:
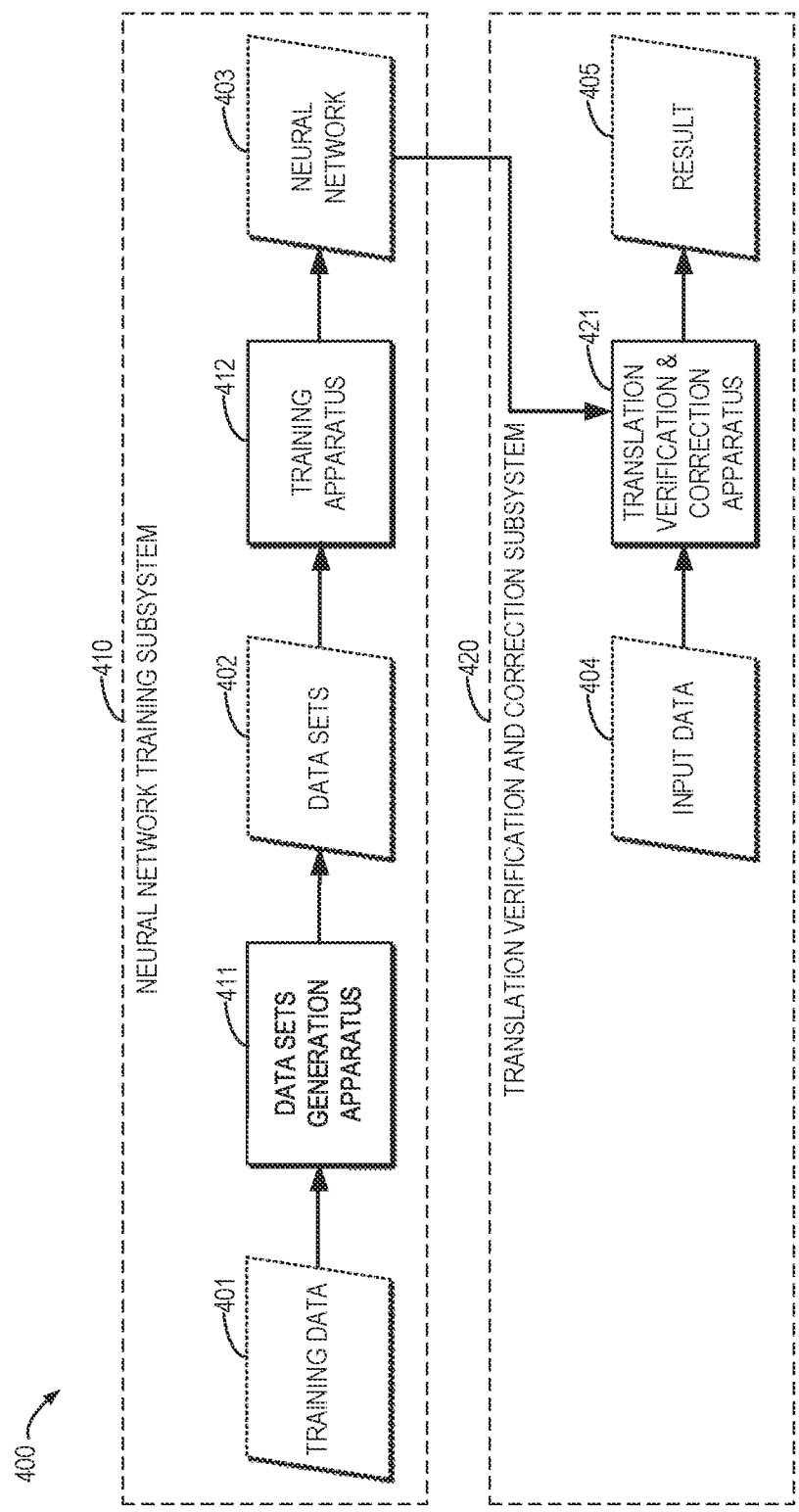
FIG. 4 depicts a system according to embodiments of the present disclosure.

With reference now to FIG. 4, a system 400 in which embodiments of the present disclosure can be implemented is shown. It is to be understood that the structure and functionality of the system 400 are described only for the purpose of illustration without suggesting any limitations as to the scope of the present disclosure. The embodiments of the present disclosure can be embodied with a different structure and/or functionality. For example, at least part or all of the system 400 may be implemented by computer system/server 12 of FIG. 1.

As shown in FIG. 4, the system 400 may generally comprise a neural network training subsystem 410 (also referred to as "subsystem 410" in the following) and a translation verification and correction subsystem 420 (also referred to as "subsystem 420" in the following). The subsystem 410 may comprise a data sets generation apparatus 411 and a training apparatus 412. The subsystem 420 may comprise a translation verification and correction apparatus 421. In some embodiments, the data sets generation apparatus 411, the training apparatus 412 and the translation verification and correction apparatus 421 can be implemented in different physical devices, respectively. Alternatively, in some embodiments, some of the data sets generation apparatus 411, the training apparatus 412 and the translation verification and correction apparatus 421 can be implemented in a same physical device. For example, at least part or all of the data sets generation apparatus 411, the training apparatus 412 and the translation verification and correction apparatus 421 may be implemented by computer system/server 12 of FIG. 1

According to embodiments of the present disclosure, the solution for translation verification and correction may comprise two phases: a neural network training phase and a neural network inference phase.

During the neural network training phase, the data sets generation apparatus 411 may obtain a plurality of groups of training data 401. Each of the plurality of groups of training data 401 may comprise a plurality of words in a source language and their translations in a target language. The data sets generation apparatus 411 may generate a plurality of data sets 402 from the plurality of groups of training data 401. The plurality of data sets 402 may comprise a first data set in the source language, a second data set in the source and target languages and a third data set in the target language, which are generated from two of the plurality of groups of training data 401. The training apparatus 412 may train, based on the plurality of data sets 402, a neural network 403 to recognize an association degree among a group of words in the source or target language. Details of the neural network training phase will be further described below with reference to FIG. 5 to FIG. 8.

During the neural network inference phase, the translation verification and correction apparatus 421 may receive input data 404 which comprises a group of words in the source language and their translations in the target language to be verified. The translation verification and correction apparatus 421 may determine an association degree among the group of words and an association degree among their translations by using the trained neural network 403. The translation verification and correction apparatus 421 may determine whether there is a wrong translation based on the association degrees. In response to determining that there is a wrong translation in the translations of the group of words, the translation verification and correction apparatus 421 may perform cross validation by using the trained neural network 403 to identify the wrong translation from the translations of the group of words. In addition, the translation verification and correction apparatus 421 may determine, from a plurality of candidate translations, a correct translation for correcting the wrong translation by using the trained neural network 403. The translation verification and correction apparatus 421 may output a result 405 which indicates at least one of the following: whether there is a wrong translation in the translations of the group of words, the identified wrong translation and the determined correct translation for correcting the wrong translation. Details of the neural network inference phase will be further described below with reference to FIG. 9 to FIG. 12.

Figure 5:
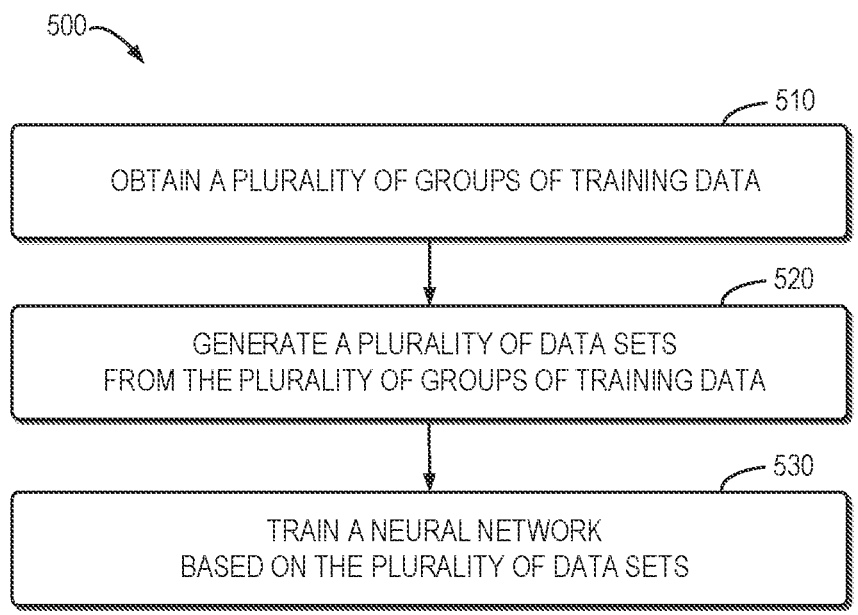
FIG. 5 depicts a flowchart of an example method for training a neural network according to embodiments of the present disclosure.

FIG. 5 depicts a flowchart of an example method 500 for training the neural network 403 according to embodiments of the present disclosure. The method 500 may be implemented by the subsystem 410 as shown in FIG. 4, for example, by means of the data sets generation apparatus 411 and the training apparatus 412. It is to be understood that the method 500 may also comprise additional blocks (not shown) and/or may omit the illustrated blocks. The scope of the present disclosure described herein is not limited in this aspect.

At block 510, the subsystem 410, for example, by means of the data sets generation apparatus 411, obtains a plurality of groups of training data 401. Each of the plurality of groups of training data 401 may comprise a plurality of words in a source language and their correct translations in a target language.

In some embodiments, the plurality of words may be associated with each other. That is, an association degree among the plurality of words exceeds a predetermined threshold. For example, it is assumed that the source language is English and the target language is Chinese. The plurality of English words may be extracted from UI menu items of a same English UI, while their Chinese translations may be extracted from UI menu items of a same Chinese UI corresponding to the English UI.

FIG. 6 depicts an example of obtaining training data according to embodiments of the present disclosure. FIG. 6 depicts UI menu items 600 extracted from an English UI and a Chinese UI corresponding to the English UI. A same key is used to identify a same UI menu item in UIs of different languages. For example, a key "project-overview" is used to identify the UI menu item "Overview" in an English UI and the UI menu item "概述" in a corresponding Chinese UI. FIG. 6 also depicts two groups of training data 610 and 620 obtained from the UI menu items 600. As shown in FIG. 6, the group of training data 610 comprises a plurality of English words "Overview", "Assets", "Environments", "Jobs" and "Settings" and their respectively corresponding Chinese translations "概述", "资产", "环境", "作业" and "设置". The group of training data 620 comprises a plurality of English words "Home", "Projects", "Collect", "Organize" and "Analyze" and their respectively corresponding Chinese translations "主页", "项目", "收集", "组织" and "分析".

It is to be understood that, different groups of training data may at least in part overlap with each other, or not overlap with each other at all. The scope of the present disclosure is not limited in this aspect. It is also to be understood that, the plurality of groups of training data can be obtained in other manners than the above manner. For example, the plurality of groups of training data can be obtained from other data sources than user interfaces.

With reference back to FIG. 5, at block 520, the subsystem 410, for example, by means of the data sets generation apparatus 411, generates a plurality of data sets 402 from the plurality of groups of training data 401. The plurality of data sets 402 comprises a first data set in the source language, a second data set in the source and target languages and a third data set in the target language, which are generated from two of the plurality of groups of training data 401.

Figure 7:
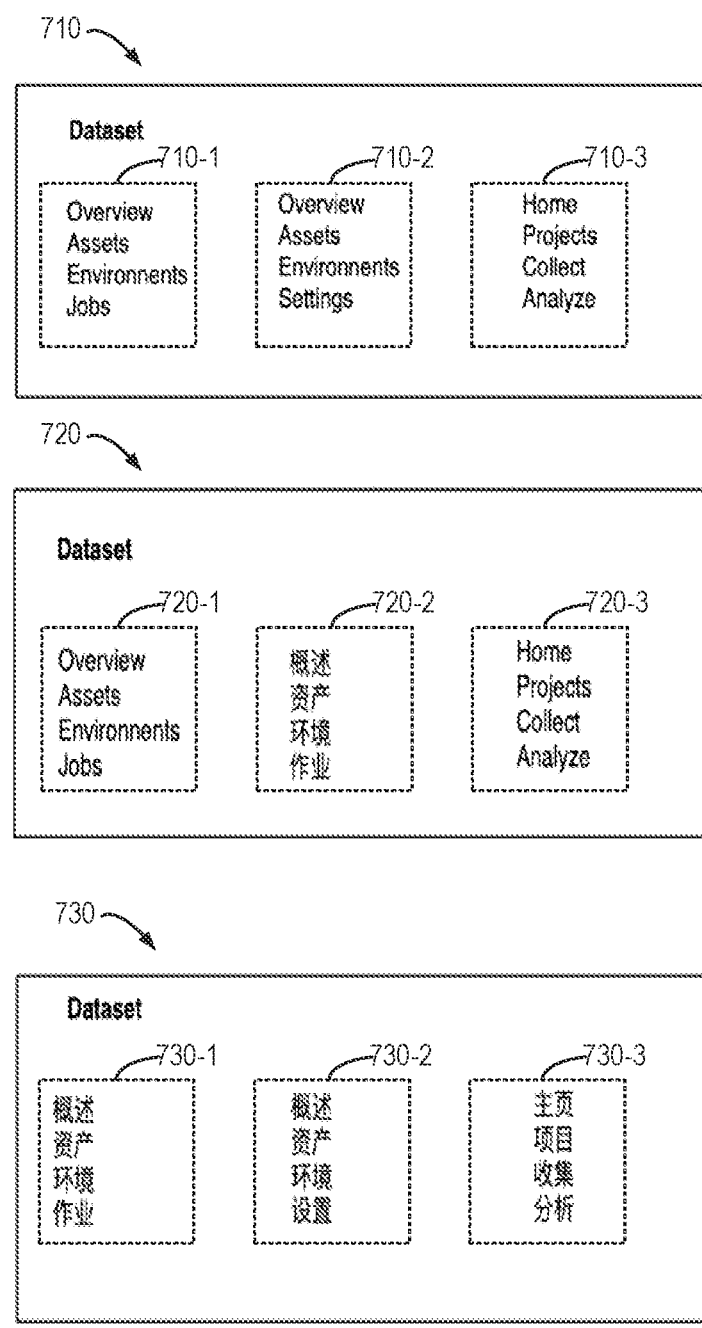
FIG. 7 depicts an example of generating data sets from the training data according to embodiments of the present disclosure.

FIG. 7 depicts an example of generating data sets from the training data according to embodiments of the present disclosure. For example, FIG. 7 illustrates a data set 710 in English, a data set 720 in English and Chinese and a data set 730 in Chinese generated from the training data 610 and 620 shown in FIG. 6.

As shown in FIG. 7, the data set 710 may comprise a first group of English words 710-1 selected from the training data 610, a second group of English words 710-2 selected from the training data 610 and a third group of English words 710-3 selected from the training data 620. The groups of words 710-1, 710-2 and 710-3 may have the same number of words. For example, as shown in FIG. 6, the training data 610 and 620 each include 5 English words and their Chinese translations. In some embodiments, in order to facilitate subsequent cross validation, the first group of English words 710-1 and the second group of English words 710-2 may each have 4 English words selected from the training data 610, that is, one less than 5. The first group of English words 710-1 and the second group of English words 710-2 may at least in part overlap with each other. The third group of English words 710-3 may also have 4 English words selected from the training data 620.

As shown in FIG. 7, the data set 720 may comprise a first group of English words 720-1 selected from the training data 610, a second group of Chinese words 720-2 selected from the training data 610 and a third group of words 720-3 (English or Chinese words) selected from the training data 620. The groups of words 720-1, 720-2 and 720-3 may have the same number of words. For example, as shown in FIG. 6, the training data 610 and 620 each include 5 English words and their Chinese translations. The first group of English words 720-1 and the second group of Chinese words 720-2 may each have 4 words selected from the training data 610, that is, one less than 5. The second group of Chinese words 720-2 may be corresponding translations of the first group of English words 720-1. Alternatively, the second group of Chinese words 720-2 may not correspond to the first group of English words 720-1 respectively. The third group of words 710-3 may also have 4 English words selected from the training data 620, as shown in FIG. 7. Alternatively, the third group of words 710-3 may have 4 Chinese words selected from the training data 620.

As shown in FIG. 7, the data set 730 may comprise a first group of Chinese words 730-1 selected from the training data 610, a second group of Chinese words 730-2 selected from the training data 610 and a third group of Chinese words 730-3 selected from the training data 620. The groups of words 730-1, 730-2 and 730-3 may have the same number of words. For example, as shown in FIG. 6, the training data 610 and 620 each include 5 English words and their corresponding Chinese translations. In some embodiments, in order to facilitate subsequent cross validation, the first group of Chinese words 730-1 and the second group of Chinese words 730-2 may respectively have 4 English words selected from the training data 610, that is, one less than 5. The first group of Chinese words 730-1 and the second group of Chinese words 730-2 may at least in part overlap with each other. The third group of Chinese words 730-3 may also have 4 Chinese words selected from the training data 620.

In this way, the plurality of data sets 402 can be generated from the plurality of groups of training data. The plurality of data sets 402 can be used to train a neural network to recognize an association degree among a group of words in the source or target language.

With reference back to FIG. 5, at block 530, the subsystem 410, for example, by means of the training apparatus 412, trains a neural network 403 based on the plurality of data sets 402, such that the neural network 403 can determine an association degree among a group of words in the source or target language.

Figure 8:
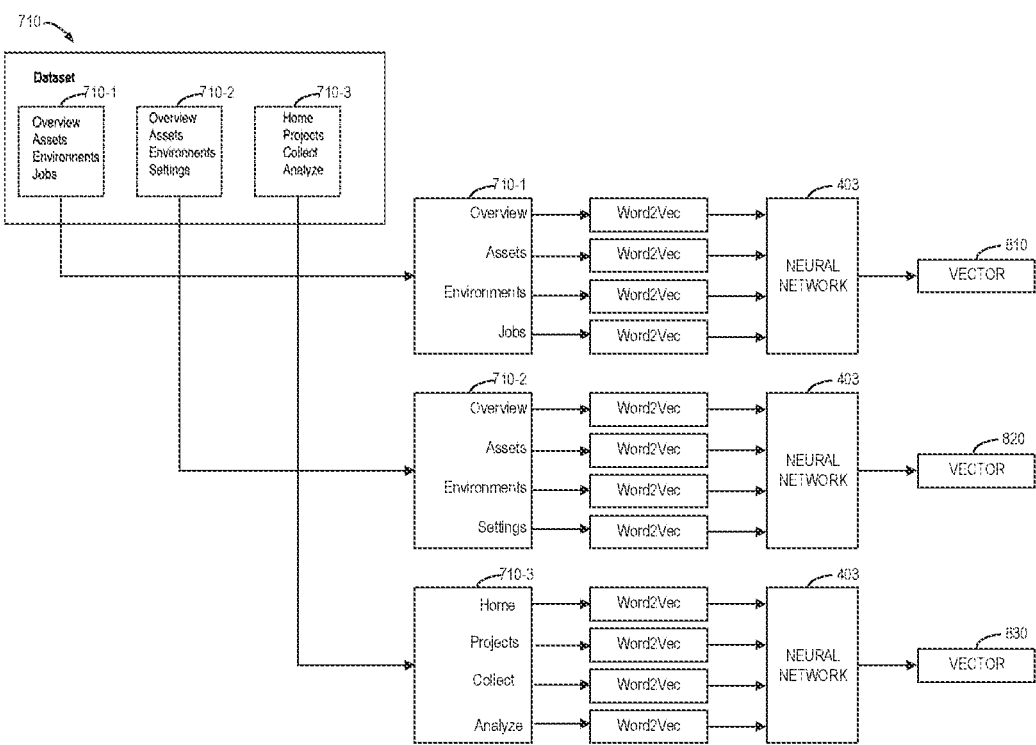
FIG. 8 depicts an example of training a neural network to determine an association degree among a group of words according to embodiments of the present disclosure.

FIG. 8 depicts an example of training the neural network 403 according to embodiments of the present disclosure. In some embodiments, the neural network 403 may be iteratively trained by using the generated plurality of data sets 402. For example, FIG. 8 illustrates one iteration of the training by using the data set 710.

As shown in FIG. 8, the data set 710 comprises a first group of English words 710-1, a second group of English words 710-2 and a third group of English words 710-3. The first group of words 710-1 may be converted into respective word vectors, for example, via word2vec or by using any other suitable tool. Then, the word vectors may be input to the neural network 403 to generate a vector 810, which indicates an association degree among the first group of words 710-1. Similarly, the second group of words 710-2 may be converted into respective word vectors and then input to the neural network 403 to generate a vector 820, which indicates an association degree among the second group of words 710-2. The second group of words 710-3 may be converted into respective word vectors and then input to the neural network 403 to generate a vector 830, which indicates an association degree among the second group of words 710-3. In the following, the vectors 810, 820 and 830 are also referred to as vector1, vector 2 and vector3, respectively.

In some embodiments, a target function for training the neural network 403 can be determined based on vector1, vector 2 and vector3 as following:

$$L = (vector1 - vector2)^2 + \alpha - (vector1 - vector3)^2 \quad (1)$$

where $\alpha$ is a predetermined threshold. In some embodiments, for example, the training apparatus 412 may train the neural network 403 by using the plurality of data sets 402 and update parameters of the neural network 403 iteratively, such that the above target function (1) is minimized. In this way, the trained neural network 403 can recognize an association degree among a group of words in the source or target language and can be used for further translation verification and correction.

Figure 9:
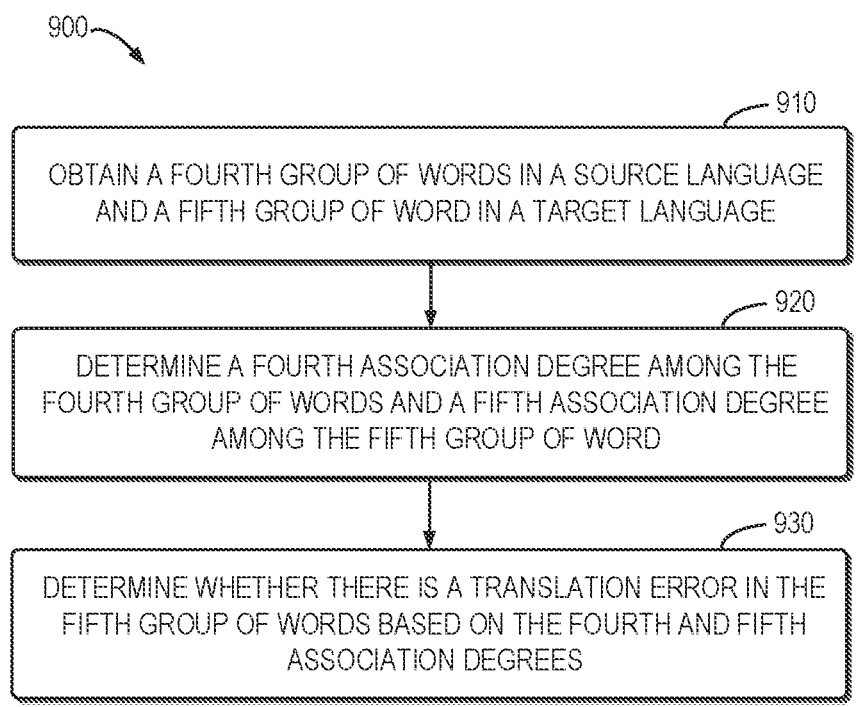
FIG. 9 depicts a flowchart of an example method for translation verification according to embodiments of the present disclosure.

FIG. 9 depicts a flowchart of an example method 900 for translation verification according to embodiments of the present disclosure. The method 900 may be implemented by the subsystem 420 as shown in FIG. 4, for example, by means of the translation verification and correction apparatus 421. It is to be understood that the method 900 may also comprise additional blocks (not shown) and/or may omit the illustrated blocks. The scope of the present disclosure described herein is not limited in this aspect.

At block 910, the subsystem 420, for example, by means of the translation verification and correction apparatus 421, obtains a fourth group of words in a source language and a fifth group of words in a target language. The fifth group of words comprises translations of the fourth group of words to be verified.

In some embodiments, the fourth group of words may be associated with each other. For example, it is assumed that the source language is English and the target language is Chinese. The fourth group of words may be extracted from UI menu items of a same English UI, while their Chinese translations to be verified may be extracted from UI menu items of a same Chinese UI corresponding to the English UI. It is also to be understood that, the fourth group of words and their translations to be verified can be obtained from other data sources than user interfaces, or can be obtained in other manners than the above manner.

At block 920, the subsystem 420, for example, by means of the translation verification and correction apparatus 421, determines a fourth association degree among the fourth group of words and a fifth association degree among the fifth group of words by using the trained neural network 403.

In some embodiments, the fourth group of words may be converted into respective word vectors, for example, via word2vec or by using any other suitable tool. Then, the word vectors may be input to the trained neural network 403 to generate a vector indicating a fourth association degree among the fourth group of words. Similarly, the fifth group of words may be converted into respective word vectors and then input to the trained neural network 403 to generate a vector indicating a fifth association degree among the fifth group of words.

At block 930, the subsystem 420, for example, by means of the translation verification and correction apparatus 421, whether there is a wrong translation in the fifth group of words based on the fourth and fifth association degrees.

In some embodiments, the translation verification and correction apparatus 421 may determine a word group distance (also referred to as "first distance" in the following) between the fourth group of words and the fifth group of words based on a difference between the first and fifth association degrees. In response to the first distance exceeding a predetermine threshold, the translation verification and correction apparatus 421 may determine that there is a wrong translation in the fifth group of words. In response to the first distance not exceeding the predetermine threshold, the translation verification and correction apparatus 421 may determine that there is no wrong translation in the fifth group of words. In this way, translations of a group of words can be verified by using the trained neural network 403.

Figure 10:
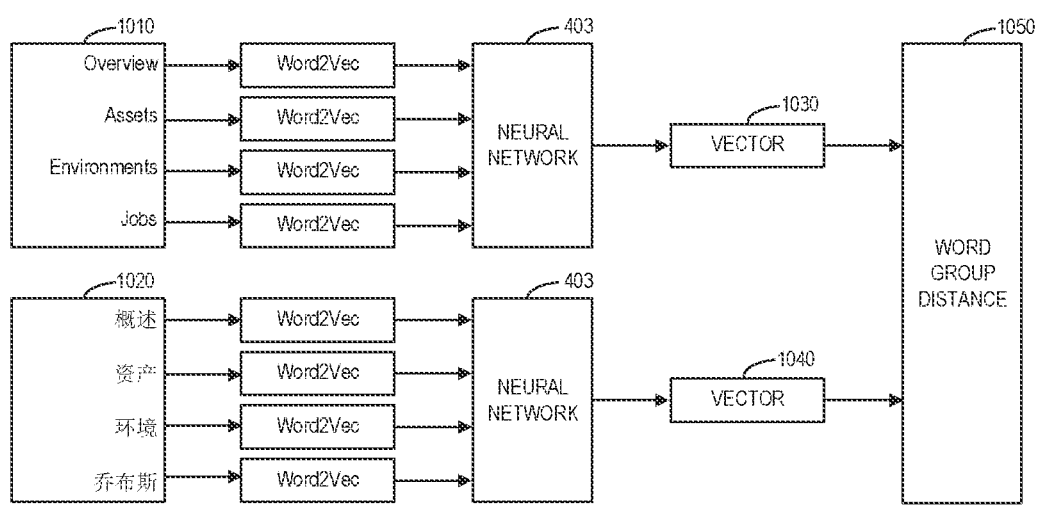
FIG. 10 depicts an example of translation verification according to embodiments of the present disclosure.

FIG. 10 depicts an example of translation verification according to embodiments of the present disclosure. FIG. 10 illustrates a group of English words 1010 (that is, the fourth group of words) and their Chinese translations 1020 (that is, the fifth group of words) to be verified. As shown in FIG. 10, the group of English words 1010 may be converted into respective word vectors and then input to the trained neural network 403 to generate a vector 1030, which indicates the association degree among the group of English words 1010. Similarly, the group of Chinese words 1020 may be converted into respective word vectors and then input to the trained neural network 403 to generate a vector 1040, which indicates the association degree among the group of Chinese words 1020. In the following, the vectors 1030 and 1040 are also referred to as vector4 and vector5, respectively. A word group distance 1050 between the group of English words 1010 and the group of Chinese words 1020 can be determined based on vector4 and vector5 as following:

$$F=(\text{vector4}-\text{vector5})^2 \qquad (2)$$

For example, in the example as shown in FIG. 10, the distance F between the group of English words 1010 and the group of Chinese words 1020 exceeds the predetermine threshold α. Therefore, it can be determined that there is a wrong translation in the group of Chinese words 1020.

In some embodiments, in response to determining that there is a wrong translation in the fifth group of words, the subsystem 420, for example, by means of the translation verification and correction apparatus 421, may perform cross validation by using the trained neural network 403 to identify the wrong translation from the fifth group of words. In addition, the subsystem 420, for example, by means of the translation verification and correction apparatus 421, may determine, from a plurality of candidate translations, a correct translation for correcting the wrong translation by using the trained neural network 403.

In some embodiments, in order to identify the wrong translation from the fifth group of words, the translation verification and correction apparatus 421 may replace a first word in the fourth group of words with a third word in the source language, so as to derive a sixth group of words. For example, the third word may come from a same UI as the fourth group of words. The translation verification and correction apparatus 421 may replace a second word, which is a translation of the first word, in the fifth group of words with a fourth word in the target language, which is a translation of the third word, so as to derive a seventh group of words. The translation verification and correction apparatus 421 may determine a sixth association degree among the sixth group of words and a seventh association degree among the seventh group words by using the trained neural network 403. For example, the sixth group of words may be converted into respective word vectors and then input to the trained neural network 403 to generate a vector indicating the sixth association degree among the sixth group of words. Similarly, the seventh group of words may be converted into respective word vectors and then input to the trained neural network 403 to generate a vector indicating the seventh association degree among the seventh group of words. The translation verification and correction apparatus 421 may determine a word group distance (also referred to as "second distance" in the following) between the sixth group of words and the seventh group of words based on the sixth and seventh associations. The determination of the second distance is similar to the determination of the first distance as shown in the above equation (2). If the second distance does not exceed the predetermined threshold α, it can be determined that the seventh group of words comprises correct translations of the sixth group of words. Therefore, the second word can be identified as the wrong translation comprised in the fifth group of words.

FIG. 11A-11D depict an example of identifying a wrong translation according to embodiments of the present disclosure.

Figure 11A:
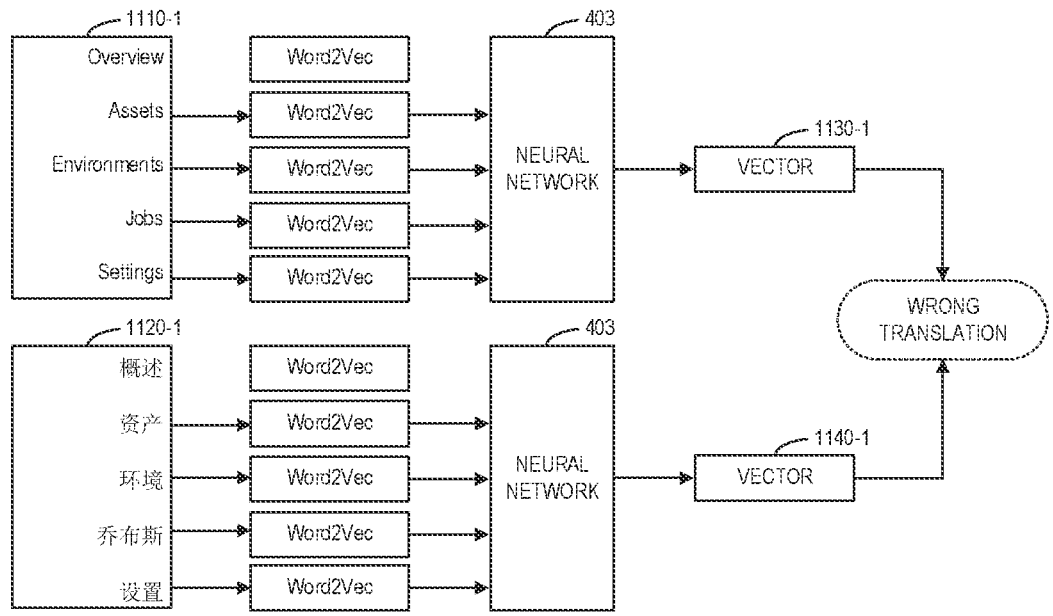
FIG. 11A-11D depict an example of identifying a wrong translation according to embodiments of the present disclosure.

As shown in FIG. 11A, the English word "Overview" in the group of English words 1010 (that is, the fourth group of words) is replaced with an English word "Settings", so as to derive a group of English words 1110-1. The Chinese translation "概述", which is corresponding to the English word "Overview", in the group of Chinese words 1020 (that is, the fifth group of words) is replaced with the Chinese translation "设置" corresponding to the English word "Settings", so as to derive a group of Chinese words 1120-1. A vector 1130-1 can be generated by using the trained neural network 403 to indicate an association degree among the group of English words 1110-1 and a vector 1140-1 can be generated by the trained neural network 403 to indicate an association degree among the group of Chinese words 1120-1. Then, a word group distance between the group of English words 1110-1 and the group of Chinese words 1120-1 can be determined based on the vectors 1130-1 and 1140-1. For example, the word group distance exceeds the predetermine threshold α. That is, the group of Chinese words 1120-1 still comprises a wrong translation.

Figure 11B:
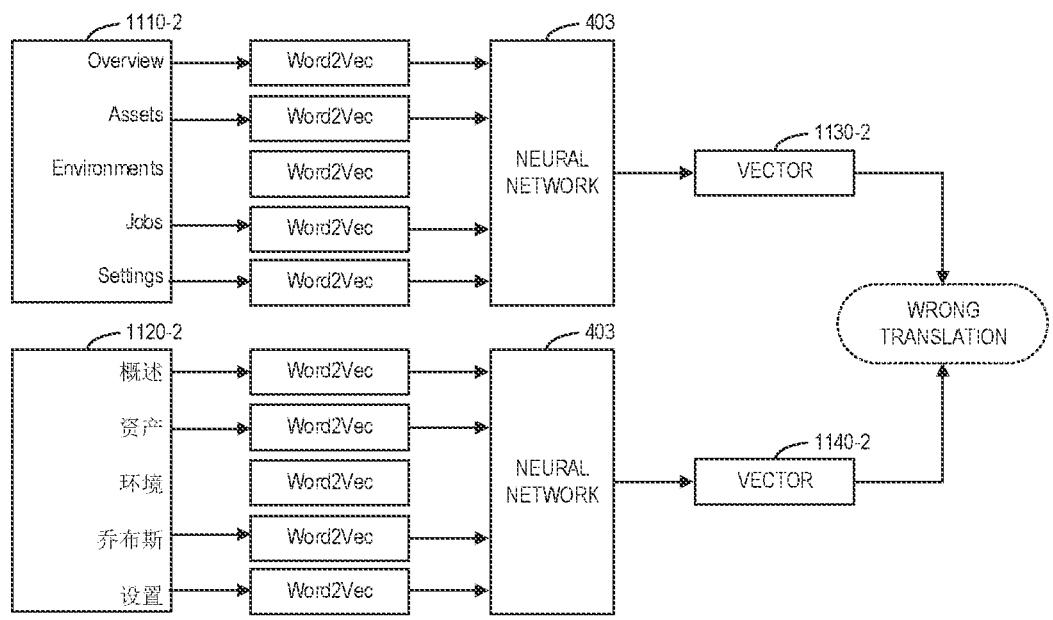

As shown in FIG. 11B, the English word "Environments" in the group of English words 1010 (that is, the fourth group of words) is replaced with an English word "Settings", so as to derive a group of English words 1110-2. The Chinese translation "环境", which is corresponding to the English word "Environments", in the group of Chinese words 1020 (that is, the fifth group of words) is replaced with the Chinese translation "设置" corresponding to the English word "Settings", so as to derive a group of Chinese words 1120-2. A vector 1130-2 can be generated by using the trained neural network 403 to indicate an association degree among the group of English words 1110-2 and a vector 1140-2 can be generated by the trained neural network 403 to indicate an association degree among the group of Chinese words 1120-2. Then, a word group distance between the group of English words 1110-2 and the group of Chinese words 1120-2 can be determined based on the vectors 1130-2 and 1140-2. For example, the word group distance exceeds the predetermine threshold α. That is, the group of Chinese words 1120-2 still comprises a wrong translation.

Figure 11C:
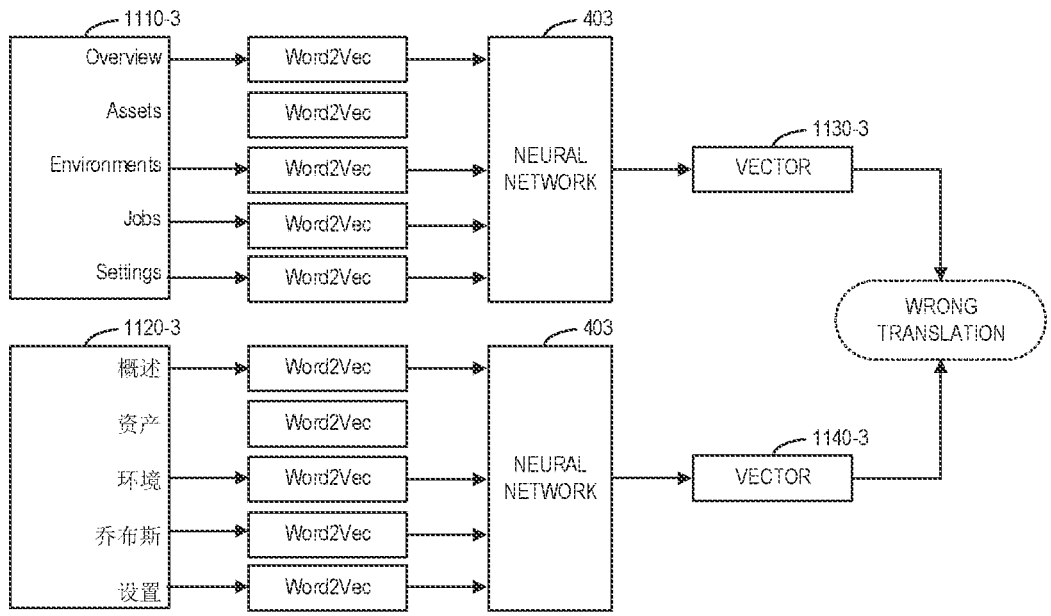

As shown in FIG. 11C, the English word "Assets" in the group of English words 1010 (that is, the fourth group of words) is replaced with an English word "Settings", so as to derive a group of English words 1110-3. The Chinese translation "资产", which is corresponding to the English word "Assets" in the group of Chinese words 1020 (that is, the fifth group of words) is replaced with the Chinese translation "设置" corresponding to the English word "Settings", so as to derive a group of Chinese words 1120-3. A vector 1130-3 can be generated by using the trained neural network 403 to indicate an association degree among the group of English words 1110-3 and a vector 1140-3 can be generated by the trained neural network 403 to indicate an association degree among the group of Chinese words 1120-3. Then, a word group distance between the group of English words 1110-3 and the group of Chinese words 1120-3 can be determined based on the vectors 1130-3 and 1140-3. For example, the word group distance exceeds the predetermine threshold α. That is, the group of Chinese words 1120-3 still comprises a wrong translation.

Figure 11D:
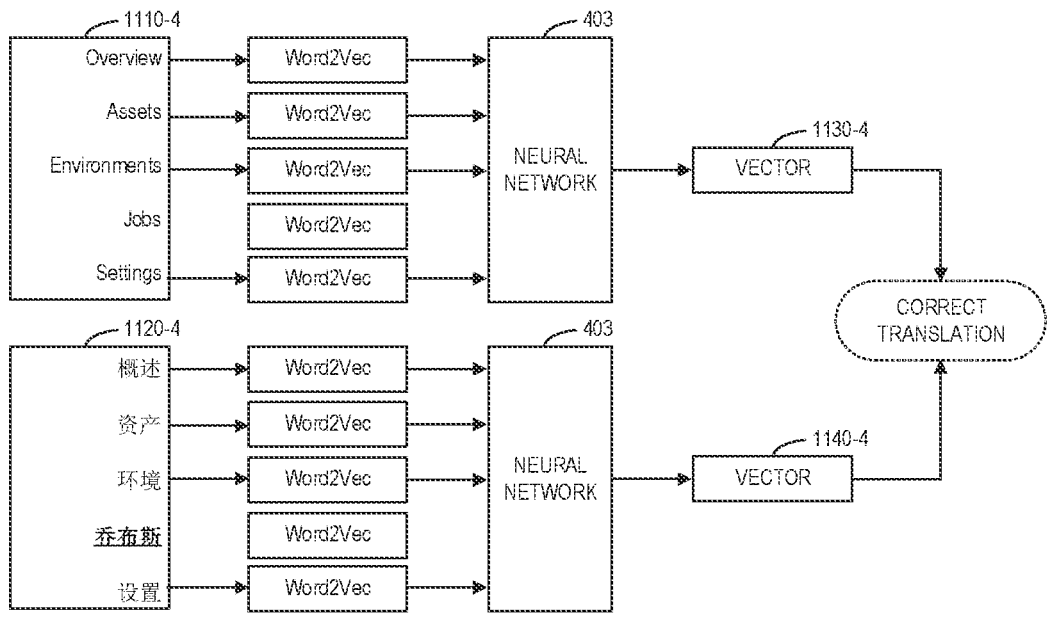

As shown in FIG. 11D, the English word "Jobs" in the group of English words 1010 is replaced with an English word "Settings", so as to derive a group of English words 1110-4. The Chinese translation "乔布斯", which is corresponding to the English word "Jobs" in the group of Chinese words 1020 is replaced with the Chinese translation "设置" corresponding to the English word "Settings", so as to derive a group of Chinese words 1120-4. A vector 1130-4 can be generated by using the trained neural network 403 to indicate an association degree among the group of English words 1110-4 and a vector 1140-4 can be generated by the trained neural network 403 to indicate an association degree among the group of Chinese words 1120-4. Then, a word group distance between the group of English words 1110-4 and the group of Chinese words 1120-4 can be determined based on the vectors 1130-4 and 1140-4. For example, the word group distance does not exceed the predetermine threshold α. That is, the group of Chinese words 1120-3 comprises no wrong translation. In this way, the Chinese translation "乔布斯" corresponding to the English word "Jobs" can be identified as the wrong translation comprised in the group of Chinese words 1020.

In some embodiments, in response to determining that the second word is a wrong translation of the first word, the translation verification and correction apparatus 421 may determine a plurality of candidate words for replacing the second word. The translation verification and correction apparatus 421 may generate a plurality of groups of words by replacing the second word in the fifth group of words with each of the candidate words. The translation verification and correction apparatus 421 may determine a respective association degree among each of the plurality of groups of words. Then, the translation verification and correction apparatus 421 may determine, from the plurality of candidate words, a correct translation of the first word based on the fourth association degree and respective association degrees of the plurality of groups of words. For example, the translation verification and correction apparatus 421 may determine a respective distance between each of the plurality of groups of words and the fourth group of words, based on a respective difference between the fourth association degree and the respective association degree among the each of the plurality of groups of words. The translation verification and correction apparatus 421 may select, from the plurality of groups of words, a group of words having the shortest distance from the fourth group of words and determined one of the plurality of candidate words comprised in the selected group of words as the correct translation of the first word.

Figure 12:
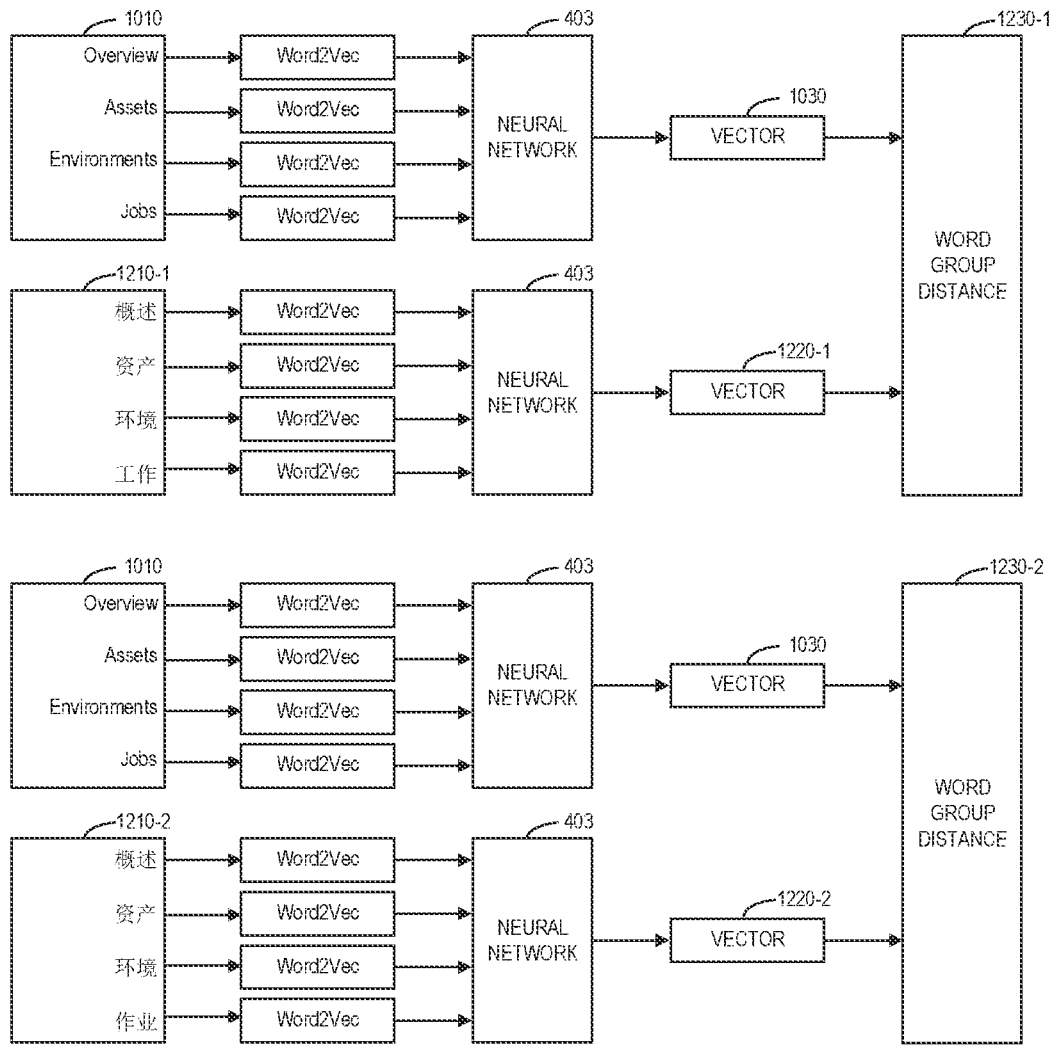
FIG. 12 depicts an example of correcting the wrong translation according to embodiments of the present disclosure.

FIG. 12 depicts an example of correcting the wrong translation according to embodiments of the present disclosure. For example, through the cross validation as shown in FIG. 11A-1D, it is determined that the Chinese translation "乔布斯" corresponding to the English word "Jobs" is a wrong translation. A plurality of candidate words for replacing the word "乔布斯" can be determined, for example, including "工作" and "作业". As shown in FIG. 12, a group of Chinese words 1210-1 can be generated by replacing the word "乔布斯" in the groups of Chinese words 1020 (that is, the fifth group of words) with the word "工作" and another group of Chinese words 1210-2 can be generated by replacing the word "乔布斯" in the groups of Chinese words 1020 with the word "作业". A vector 1220-1 indicating an association degree among the group of Chinese words 1210-1 can be generated by using the trained neural network 403. Then, a word group distance 1230-1 between the group of English words 1010 (that is, the fourth group of words) and the group of Chinese words 1210-1 can be determined based on the vector 1030 (which indicates the fourth association degree among the group of English words 1010) and the vector 1220-1. Similarly, a vector 1220-2 indicating an association degree among the group of Chinese words 1210-2 can be generated by using the trained neural network 403. Then, a word group distance 1230-2 between the group of English words 1010 and the group of Chinese words 1210-2 can be determined based on the vector 1030 (which indicates the fourth association degree among the group of English words 1010) and the vector 1220-2. For example, the word group distance 1230-1 exceeds the word group distance 1230-2. Therefore, the word "作业" can be determined as a correct translation for replacing the word "乔布斯".

It can be seen that embodiments of the present disclosure provide a solution for translation verification and correction. This solution can automatically identify and correct a translation error in translations of isolated words without human intervention. For example, this solution can be used to identify and correct a translation error in translations of UI menu/tab items, thereby mitigating the negative effects of error translations in UIs and improving the user experience.

It should be noted that the processing of translation verification and correction according to embodiments of this disclosure could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
obtaining, by one or more processors, a plurality of groups of training data, wherein each of the plurality of groups of training data comprises a plurality of words in a source language and translations of the plurality of words in a target language;
generating, by one or more processors, a plurality of data sets from the plurality of groups of training data, wherein the plurality of data sets comprises a first data set in the source language, a second data set in the source and target languages and a third data set in the target language;
training, by one or more processors, a neural network based on the plurality of data sets for determining an association degree among a group of words in the source or target language;
obtaining, by one or more processors, a group of words in the source language and translations of the group of words in the target language;
converting, by one or more processors, the group of words in the source language into a first word vector and inputting the first word vector to the trained neural network to generate a first vector indicating an association degree among the group of words in the source language;
converting, by one or more processors, the translations of the group of words in the target language into a second word vector and inputting the second word vector to the trained neural network to generate a second vector indicating an association degree among the translations of the group of words in the target language;
using the first vector and the second vector, determining, by one or more processors, a distance between the group of words in the source language and the translations of the group of words in the target language, wherein the distance is equal to a square of a difference between the first vector and the second vector;

in response to the distance between the group of words in the source language and the translations of the group of words in the target language exceeding a predetermined threshold, determining, by one or more processors, there is an error in the translations of the group of words; and in response to determining that an error occurs in the translations of the group of words, generating, by one or more processors, a correct translation from a plurality of candidate translations determined using the trained neural network.

2. The method of claim 1, wherein the plurality of data sets comprises a first data set in the source language, a second data set in the source and target languages and a third data set in the target language comprises:

selecting, by one or more processors, a first group of words in the source language and a second group of words in the source language from a first group of training data of the plurality of groups of training data, wherein the first group of words has the same number of words as the second group of words;

selecting, by one or more processors, a third group of words in the source language from a second group of training data of the plurality of groups of training data, wherein the third group of words has the same number of words as the first group of words and the second group of words; and wherein generating the plurality of data sets from the plurality of groups of training data comprises:

generating, by one or more processors, the plurality of data sets from the first data set including the first group of words, the second group of words and the third group of words.

3. The method of claim 1, wherein the plurality of data sets comprises a first data set in the source language, a second data set in the source and target languages and a third data set in the target language comprises:

selecting, by one or more processors, a first group of words in the source language and a second group of words in the target language from the first group of training data of the plurality of groups of training data;

selecting, by one or more processors, a third group of words in the source language from a second group of training data of the plurality of groups of training data, wherein the third group of words has the same number of words as the first group of words and the second group of words; and wherein generating the plurality of data sets from the plurality of groups of training data comprises:

generating, by one or more processors, the plurality of data sets from the plurality of groups of training data including the first group of words, the second group of words and the third group of words.

4. The method of claim 1, wherein the plurality of data sets comprises a first data set in the source language, a second data set in the source and target languages and a third data set in the target language comprises:

selecting, by one or more processors, a first group of words in the target language and a second group of words in the target language from a first group of training data of the plurality of groups of training data;

selecting, by one or more processors, a third group of words in the target language from a second group of training data of the plurality of groups of training data, wherein the third group of words has the same number of words as the first group of words and the second group of words; and wherein generating the plurality of data sets from the plurality of groups of training data comprises:

generating, by one or more processors, the plurality of data sets from the first data set including the first group of words, the second group of words and the third group of words.

5. The method of claim 1, wherein each data set of the plurality of data sets comprises a first group of words and a second group of words selected from a first group of training data and a third group of words selected from a second group of training data, and training the neural network comprises:

determining, by one or more processors, a first association degree among the first group of words, a second association degree among the second group of words and a third association degree among the third group of words by using the neural network;

determining, by one or more processors, a target function based on a first difference between the first and second association degrees and a second difference between the first and third association degrees; and training, by one or more processors, the neural network by minimizing the target function.

6. The method of claim 5, further comprising:

obtaining, by one or more processors, a fourth group of words in a source language and a fifth group of words in a target language, wherein at least a part of the fifth group of words are translations of the fourth group of words to be verified;

determining, by one or more processors, a fourth association degree among the fourth group of words and a fifth association degree among the fifth group of words by using the trained neural network; and determining, by one or more processors, whether there is a wrong translation in the fifth group of words based on the fourth and fifth association degrees.

7. The method of claim 6, wherein determining whether there is a wrong translation in the fifth group of words comprises:

determining, by one or more processors, a first distance between the fourth group of words and the fifth group of words based on a difference between the fourth and fifth association degrees;

in response to the first distance exceeding a predetermine threshold, determining that there is a wrong translation in the fifth group of words; and in response to the first distance not exceeding the predetermine threshold, determining that there is no wrong translation in the fifth group of words.

8. The method of claim 6, further comprising:

in response to determining that there is a wrong translation in the fifth group of words, generating, by one or more processors, a sixth group of words by replacing a first word in the fourth group of words with a third word in the source language;

generating, by one or more processors, a seventh group of words by replacing a second word in the fifth group of words with a fourth word in the target language, wherein the second word is a translation of the first word and the fourth word is a translation of the third word;

determining, by one or more processors, a sixth association degree among the sixth group of words and a seventh association degree among the seventh group of words by using the trained neural network; and determining, by one or more processors, whether the second word is a wrong translation of the first word based on the sixth and seventh association degrees.

9. The method of claim 8, wherein determining whether the second word is a wrong translation of the first word comprises:
    determining, by one or more processors, a second distance between the sixth group of words and the seventh group of words based on a difference between the sixth and seventh association degrees; and
    in response to the second distance not exceeding a pre-determine threshold, determining, by one or more processors, that the second word is a wrong translation of the first word.

10. The method of claim 9, further comprising:
    in response to determining that the second word is a wrong translation of the first word,
        determining, by one or more processors, a plurality of candidate words for replacing the second word;
        generating, by one or more processors, a plurality of groups of words by replacing the second word in the fifth group of words with each of the candidate words;
        determining, by one or more processors, a respective association degree among each of the plurality of groups of words; and
        determining, by one or more processors, a correct translation of the first word from the plurality of candidate words based on the fourth association degree and respective association degrees of the plurality of groups of words.

11. The method of claim 10, where determining the correct translation of the first word comprises:
    determining, by one or more processors, a respective distance between each of the plurality of groups of words and the fourth group of words based on a respective difference between the fourth association degree and the respective association degree among the each of the plurality of groups of words;
    selecting, by one or more processors, a group of the plurality of groups of words having the shortest distance from the fourth group of words; and
    determining, by one or more processors, one of the plurality of candidate words comprised in the selected group of words as the correct translation of the first word.

12. A system comprising:
    a processing unit; and
    a memory coupled to the processing unit and storing instructions thereon, the instructions, when executed by the processing unit, performing actions comprising:
    obtaining, by one or more processors, a plurality of groups of training data, wherein each of the plurality of groups of training data comprises a plurality of words in a source language and translations of the plurality of words in a target language;
    generating, by one or more processors, a plurality of data sets from the plurality of groups of training data, wherein the plurality of data sets comprises a first data set in the source language, a second data set in the source and target languages and a third data set in the target language;
    training, by one or more processors, a neural network based on the plurality of data sets for determining an association degree among a group of words in the source or target language;
    obtaining, by one or more processors, a group of words in the source language and translations of the group of words in the target language;
    converting, by one or more processors, the group of words in the source language into a first word vector and inputting the first word vector to the trained neural network to generate a first vector indicating an association degree among the group of words in the source language;
    converting, by one or more processors, the translations of the group of words in the target language into a second word vector and inputting the second word vector to the trained neural network to generate a second vector indicating an association degree among the translations of the group of words in the target language;
    using the first vector and the second vector, determining, by one or more processors, a distance between the group of words in the source language and the translations of the group of words in the target language, wherein the distance is equal to a square of a difference between the first vector and the second vector;
    in response to the distance between the group of words in the source language and the translations of the group of words in the target language exceeding a predetermined threshold, determining, by one or more processors, there is an error in the translations of the group of words; and
    in response to determining that an error occurs in the translations of the group of words, generating, by one or more processors, a correct translation from a plurality of candidate translations determined using the trained neural network.

13. The system of claim 12, wherein the plurality of data sets comprises a first data set in the source language, a second data set in the source and target languages and a third data set in the target language comprises:
    selecting, by one or more processors, a first group of words in the source language and a second group of words in the source language from a first group of training data of the plurality of groups of training data, wherein the first group of words has the same number of words as the second group of words;
    selecting, by one or more processors, a third group of words in the source language from a second group of training data of the plurality of groups of training data, wherein the third group of words has the same number of words as the first group of words and the second group of words; and
    wherein generating the plurality of data sets from the plurality of groups of training data comprises:
    generating, by one or more processors, the plurality of data sets from the first data set including the first group of words, the second group of words and the third group of words.

14. The system of claim 12, wherein each data set of the plurality of data sets comprises a first group of words and a second group of words selected from a first group of training data and a third group of words selected from a second group of training data, and training the neural network comprises:
    determining, by one or more processors, a first association degree among the first group of words, a second association degree among the second group of words and a third association degree among the third group of words by using the neural network;
    determining, by one or more processors, a target function based on a first difference between the first and second association degrees and a second difference between the first and third association degrees; and training, by one or more processors, the neural network by minimizing the target function.

15. A system of claim 12, further comprising:

obtaining, by one or more processors, a fourth group of words in a source language and a fifth group of words in a target language, wherein at least a part of the fifth group of words are translations of the fourth group of words to be verified;

determining, by one or more processors, a fourth association degree among the fourth group of words and a fifth association degree among the fifth group of words by using the trained neural network; and determining, by one or more processors, whether there is a wrong translation in the fifth group of words based on the fourth and fifth association degrees.

16. The system of claim 15, wherein the actions further comprise:

in response to determining that there is a wrong translation in the fifth group of words, generating a sixth group of words by replacing a first word in the fourth group of words with a third word in the source language;

generating a seventh group of words by replacing a second word in the fifth group of words with a fourth word in the target language, wherein the second word is a translation of the first word and the fourth word is a translation of the third word;

determining a sixth association degree among the sixth group of words and a seventh association degree among the seventh group of words by using the trained neural network; and determining whether the second word is a wrong translation of the first word based on the sixth and seventh association degrees.

17. A computer program product, the computer program product comprising a computer readable storage medium having program instructions embodied therewith, the program instructions executable by an electronic device to cause the electronic device to perform actions comprising:

obtaining, by one or more processors, a plurality of groups of training data, wherein each of the plurality of groups of training data comprises a plurality of words in a source language and translations of the plurality of words in a target language;

generating, by one or more processors, a plurality of data sets from the plurality of groups of training data, wherein the plurality of data sets comprises a first data set in the source language, a second data set in the source and target languages and a third data set in the target language;

training, by one or more processors, a neural network based on the plurality of data sets for determining an association degree among a group of words in the source or target language;

obtaining, by one or more processors, a group of words in the source language and translations of the group of words in the target language;

converting, by one or more processors, the group of words in the source language into a first word vector and inputting the first word vector to the trained neural network to generate a first vector indicating an association degree among the group of words in the source language;

converting, by one or more processors, the translations of the group of words in the target language into a second word vector and inputting the second word vector to the trained neural network to generate a second vector indicating an association degree among the translations of the group of words in the target language;

using the first vector and the second vector, determining, by one or more processors, a distance between the group of words in the source language and the translations of the group of words in the target language, wherein the distance is equal to a square of a difference between the first vector and the second vector;

in response to the distance between the group of words in the source language and the translations of the group of words in the target language exceeding a predetermined threshold, determining, by one or more processors, there is an error in the translations of the group of words; and in response to determining that an error occurs in the translations of the group of words, generating, by one or more processors, a correct translation from a plurality of candidate translations determined using the trained neural network.

18. The computer program product of claim 17, wherein the plurality of data sets comprises a first data set in the source language, a second data set in the source and target languages and a third data set in the target language comprises:

selecting, by one or more processors, a first group of words in the source language and a second group of words in the source language from a first group of training data of the plurality of groups of training data, wherein the first group of words has the same number of words as the second group of words;

selecting, by one or more processors, a third group of words in the source language from a second group of training data of the plurality of groups of training data, wherein the third group of words has the same number of words as the first group of words and the second group of words; and wherein generating the plurality of data sets from the plurality of groups of training data comprises:

generating, by one or more processors, the plurality of data sets from the first data set including the first group of words, the second group of words and the third group of words.

19. A computer program product of claim 17, further comprising:

obtaining, by one or more processors, a fourth group of words in a source language and a fifth group of words in a target language, wherein at least a part of the fifth group of words are translations of the fourth group of words to be verified;

determining, by one or more processors, a fourth association degree among the fourth group of words and a fifth association degree among the fifth group of words by using the trained neural network; and determining, by one or more processors, whether there is a wrong translation in the fifth group of words based on the fourth and fifth association degrees.

20. The computer program product of claim 19, wherein the actions further comprise:

in response to determining that there is a wrong translation in the fifth group of words, generating a sixth group of words by replacing a first word in the fourth group of words with a third word in the source language;

generating a seventh group of words by replacing a second word in the fifth group of words with a fourth word in the target language, wherein the second word is a translation of the first word and the fourth word is a translation of the third word;
determining a sixth association degree among the sixth group of words and a seventh association degree among the seventh group of words by using the trained neural network; and
determining whether the second word is a wrong translation of the first word based on the sixth and seventh association degrees.

\* \* \* \* \*